Figure 1:
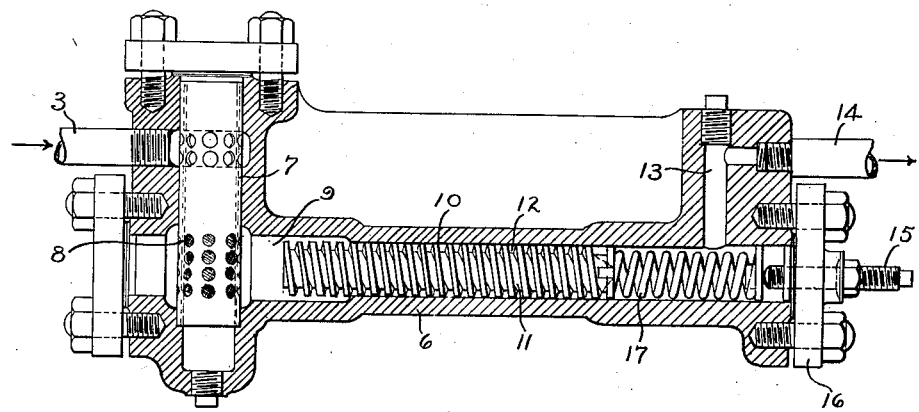

No. 891,377. PATENTED JUNE 23, 1908.
F. SAMUELSON.
SYSTEM OF FORCED LUBRICATION.
APPLICATION FILED OCT. 31, 1907.

Witnesses:

Inventor:
Frederick Samuelson,
by Albert H. Davis
Att'y

UNITED STATES PATENT OFFICE.

FREDERICK SAMUELSON, OF RUGBY, ENGLAND, ASSIGNOR TO GENERAL ELECTRIC COMPANY, A CORPORATION OF NEW YORK.

SYSTEM OF FORCED LUBRICATION.

No. 891,377.  Specification of Letters Patent.  Patented June 23, 1908.

Application filed October 31, 1907. Serial No. 399,985.

*To all whom it may concern:*

Be it known that I, FREDERICK SAMUELSON, a subject of the King of Sweden, residing at Rugby, England, have invented certain new and useful Improvements in Systems of Forced Lubrication, of which the following is a specification.

My invention relates to systems of forced lubrication for bearings and more particularly for bearings of elastic fluid turbines such as the step-bearings of Curtis turbines of the vertical type in which the lubricant is employed to counterbalance the weight of the rotating parts and the thrust, if any, due to the elastic fluid operating the turbine, or in the case of horizontal turbines the thrust due to the latter cause only.

In order to effect a saving in cost it is desirable when a number of turbines are operated together driving a common load to lubricate the bearings of all of them from the same source of lubricant under pressure and to insert in a separate pipe leading from the main source to each turbine a baffler, the function of which is to give a reduced pressure in the branch pipe suitable for its corresponding turbine.

The bearing-thrust or pressure for each turbine is subject to variations due to changes in the load on the turbine. If, for instance, in a system of two turbines, one is running under a light load when the other is under full load, the thrust bearing of the latter turbine will generally require a considerably higher pressure than that required for the turbine running light. As a result the difference in the pressures acting on the ends of the baffler supplying the heavily loaded turbine is less than that of the lightly loaded machine, and the latter will receive more than its proper share from the main lubricant supply. This supply is substantially constant, the pump or pumps supplying the lubricant running at constant speed. The fully loaded turbine may thus be in danger of damaging its step-bearing unless the pumps are made to supply an amount of lubricant which, but for the circumstances described, might be considered excessive and too expensive.

The object of my invention is to overcome the difficulties mentioned by making the various bafflers automatic in their action so that any turbine at all times and independent of variations in load and in thrust bearing pressure shall receive a constant supply of lubricant from the main source. This result is secured by automatically varying the length of the restricting or pressure-absorbing friction passages in the baffler, so that this length is increased when the difference between the pressures acting on opposite sides of the baffler is increased and vice versa, thus insuring a constant flow of lubricant to the bearing.

Figure 2:
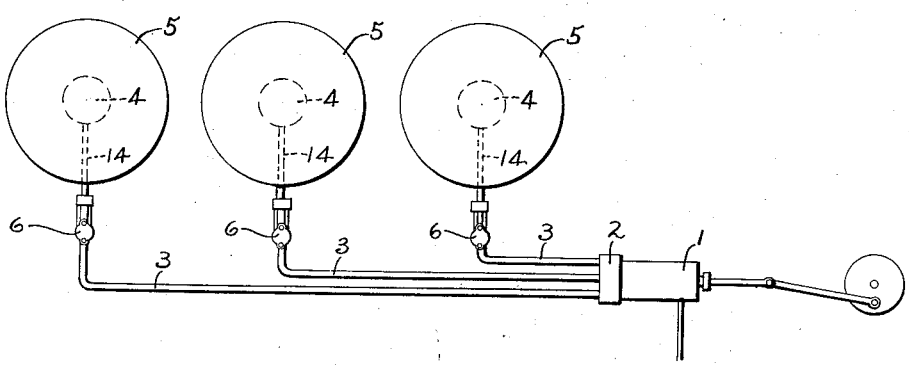

In the accompanying drawing, illustrating one embodiment of my invention, Figure 1 is a longitudinal section through the baffler; and Fig. 2 is a diagrammatic view showing the manner in which the invention is applied to a battery of turbines.

A pump 1, or other pressure imparting device receives its supply from a suitable source and forces lubricant from a main header 2 through conduits 3 to each of the step-bearings 4 of the turbines 5. An automatic baffler 6 is included in each conduit between the header and the bearings to regulate the pressure of the lubricant supplied to the latter. The invention is not limited, however, to the particular number of turbines shown nor to lubricating the step bearings alone. The number and size of turbines may be varied and bafflers may be located in conduits leading to other bearings besides the step-bearings, if desired.

Each baffler is inclosed in a casing 6 having a cylindrical chamber 7 provided with an inlet opening to which the conduit 3 conveys lubricant from the pump. Located within the chamber 7 is a strainer 8. From the strainer the lubricant passes into a horizontal chamber 9 leading to a cylindrical bore 10 of smaller diameter than the chamber. Slidably mounted within this bore is a cylindrical plug 11 having a helical groove 12 in its surface forming between it and the wall of the bore a continuous passage of considerable length through which the lubricant flows on its way to a duct 13 connected with the pipe 14 leading from the baffler to the step-bearing. An adjusting screw 15 is mounted in the cover 16 which closes the right end of the bore 10, and between the end of this screw and the adjacent end of the plug 11 is a compression spring 17. The same result could, obviously, be secured by connecting a tension spring with the opposite end of the plug.

From an inspection of Fig. 1, it will be seen that a certain number of turns of the groove 12 on the portion of the plug 11 which projects into the chamber 9 are inoperative, the effective portion of the groove or passage being that confined within the bore 10. By moving the plug longitudinally in the bore, the effective length of the baffling passage may be increased or decreased, by decreasing or increasing the number of turns projecting into the chamber 9.

The baffler produces a drop in pressure between the inlet conduit 3 and the outlet 14, and the unequal pressures on the two ends of the grooved plug 11 are balanced by the compression spring 17. If the pressure on the outlet or thrust bearing side of the baffler should be decreased by some cause, the plug will be forced to the right, Fig. 1, compressing the spring until the balance is restored and a portion of the helical passage 12 will be carried from the chamber 9 into the bore 10. The length of the passage will be so increased by this movement of the plug as to neutralize the effect of the increase in the pressure difference, thus keeping the flow substantially the same as before. Should the pressure on the thrust bearing side of the baffler increase, the plug will move toward the left, Fig. 1, until balance is restored by sufficiently shortening the length of the helical passage within the bore 10, and the flow will be maintained practically constant. By means of my invention it is thus possible to obtain a substantially constant flow of lubricant to the bearing although the pressure at the bearing may vary considerably.

In accordance with the provisions of the patent statutes, I have described the principle of operation of my invention, together with the apparatus which I now consider to represent the best embodiment thereof; but I desire to have it understood that the apparatus shown in only illustrative, and that the invention can be carried out by other means.

What I claim as new, and desire to secure by Letters Patent of the United States, is,—

1. In a system of forced lubrication for shaft bearings, the combination of means for imparting service pressure to the lubricant, conduits conveying lubricant to each bearing including a baffler, with means for automatically varying the resistance to the flow of lubricant through the baffler in response to variations in pressure on the bearing side of the baffler to maintain a constant flow of lubricant to the bearing.

2. In a system of forced lubrication for shaft bearings, the combination of a pump for imparting service pressure to the lubricant, with conduits conveying lubricant under pressure to each bearing including a baffler having a tortuous passage, and means for automatically varying the effective length of each passage in response to variations in pressure on the bearing side of the baffler to maintain a constant flow of lubricant to the bearing.

3. In a system of forced lubrication for shaft bearings, the combination of a pump for imparting a substantially constant service pressure to the lubricant, with conduits conveying lubricant under pressure to each bearing, a movable baffler in each conduit having a helical passage, and a spring tending to move the baffler in one direction, but which permits it to move in either direction under variations in pressure on the bearing side of the baffler to vary the effective length of the passage and to maintain a constant flow of lubricant to the bearing.

4. In a system of forced lubrication for a shaft bearing, the combination of a pump for imparting a substantially constant service pressure to the lubricant, with a conduit conveying lubricant under pressure to the bearing, a baffler in the conduit comprising a casing having a cylindrical bore, a plug slidably mounted therein which has a continuous groove in its surface forming with the wall of the bore a helical passage for the lubricant, a chamber in the casing of larger diameter than the bore into which one end of the plug may be moved to vary the effective length of the passage, and a spring acting on one end of the plug which tends to move it toward the chamber but permits it to move in either direction under variations in pressure on the bearing side of the baffler to vary distance which the plug projects into the chamber.

5. In a system of forced lubrication for bearings, the combination of a pump for imparting a substantially constant service pressure to the lubricant, with a casing having an inlet receiving lubricant from the pump, an outlet conveying lubricant to the bearing, and a cylindrical bore intermediate the inlet and the outlet, a cylindrical plug slidably mounted in the bore and provided with a continuous groove in its surface which forms with the wall of the bore a helical passage for the lubricant, a compression spring within the casing engaging the outlet end of the plug and tending to move it toward the chamber but which permits the end of the plug to move into and out of the chamber, under the influence of the rise and fall of pressure in the outlet, to vary the effective length of said passage and to maintain a constant flow of lubricant to the bearing, and means for adjusting the spring.

In witness whereof, I have hereunto set my hand this 15th day of October, 1907.

FREDERICK SAMUELSON.

Witnesses:
 CHARLES H. FULLER,
 J. A. FOSTER.